J. B. WEST.
INSTRUMENT FOR LOCATING DEFECTIVE COILS IN ELECTRIC MACHINES.
APPLICATION FILED JULY 25, 1917.

1,432,003.

Patented Oct. 17, 1922.

INVENTOR
John B. West.

BY
Parsons & Parsons
ATTORNEYS

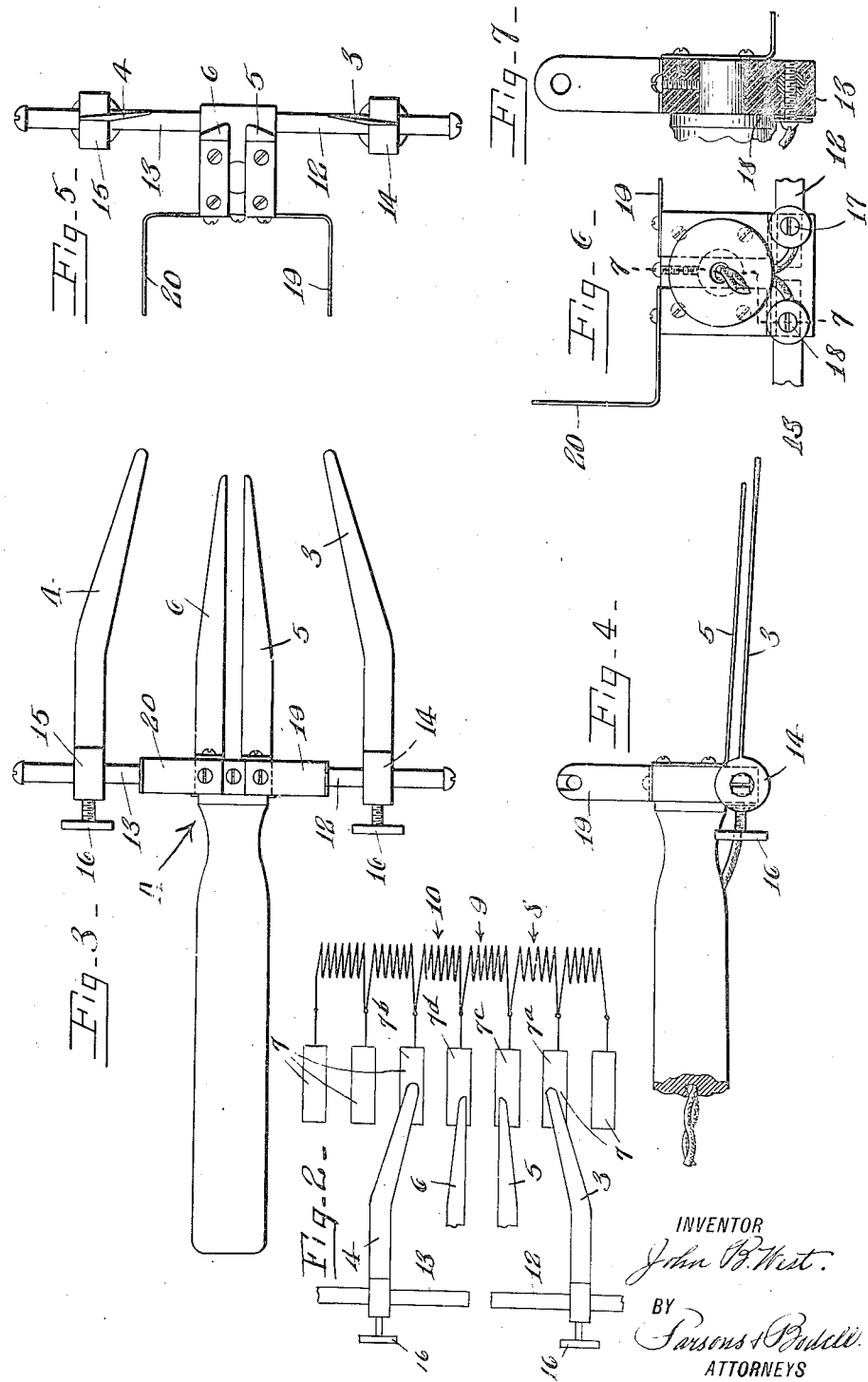

Patented Oct. 17, 1922.

1,432,003

UNITED STATES PATENT OFFICE.

JOHN B. WEST, OF SYRACUSE, NEW YORK.

INSTRUMENT FOR LOCATING DEFECTIVE COILS IN ELECTRIC MACHINES.

Application filed July 25, 1917. Serial No. 182,664.

*To all whom it may concern:*

Be it known that I, JOHN B. WEST, a citizen of the United States, and a resident of Syracuse, in the county of Onondaga and State of New York, have invented a certain new and useful Instrument for Locating Defective Coils in Electric Machines, of which the following is a specification.

This invention has for its object the production of a method and instrument for locating defective coils of electrical machines, as solenoids, the field windings, and armature coils of generators and motors; and the invention consists in the method and in the novel features hereinafter set forth and claimed.

In describing this invention, reference is had to the accompanying drawings in which like characters designate corresponding parts in all the views.

Figure 1 is a diagrammatic view illustrating one form of my invention, the change-over switch being arranged to adjust the instrument for use when the feed current is alternating, the contiguous part of a generator, the armature coils of which are to be tested, being also shown.

Figure 1ᵃ is a diagrammatic view of a slightly modified form of a testing fork, the contiguous part of a generator being also shown as in Fig. 1.

Figure 2 is a diagrammatic view illustrating the connection of the instrument with the coils of a generator.

Figures 3 and 4 are respectively, a plan view and a side elevation of the testing fork, the current indicator as the ammeter being omitted.

Figure 5 is a front elevation of parts seen in Fig. 3.

Figure 6 is an enlarged fragmentary rear elevation of parts seen in Fig. 3.

Figure 7 is a sectional view on line 7—7, Fig. 6.

Figure 8 is another form of my invention illustrating the instrument adapted to test stator coils.

My method of testing the coils of electric machines for defects therein as breaks, short circuits, etc., includes connecting a testing circuit in series with a coil or coils, and comparing the current by means of a meter, telephone receiver or other current indicator, with the current passing through another coil or other coils as all normal coils will give substantially the same current indication. In case any coil or arbitrary group of coils does not give the same indication as any other normal coil or group, it is known that defects exist in the former coil or group of coils, and in case the test is first made in a group of coils instead of in single coils, and a defect is found in the group, the exact coil in which the defect is located can be found by narrowing down the test to less number of coils. In some instances, as when testing stator coils the test is started by including a quarter of the coils or an eighth, or any other arbitrary number, and when a defect is found in any group the test is narrowed down in said group. In other instances, as in the case of armature or rotor coils, the test is made through the commutator segments.

If there is a short circuit in the coils between the contacts, less current than normal will pass through the indicators and a less indication, as a lower sound in a telephone receiver or smaller reading on a meter, will be obtained, and if there is an open or partially open circuit, the sound will be louder than normal, or the meter will act the same as or in some cases give a greater reading than when connected directly in the testing circuit.

In Fig. 1, I have shown an instrument for testing the coils of generators connected to means for supplying the testing current.

A designates an instrument connected to the terminals of the apparatus used when the feed current is alternating, and B an instrument connected to the terminals used when the supply current is direct. 1 and 2 designate the lead wires of the testing circuit which are electrically connected to contacts 3, 4 of the testing instrument.

5 and 6 are additional contacts which are connected in circuit with an ammeter carried by the body of the instrument. The outside contacts 3, 4 are insulated from each other, and are designed to make contact with spaced apart commutator segments 7 and the inner contacts 5, 6 to make contact with a pair of commutator segments located between the segments 7 with which the contacts 3, 4 are engaged. The instrument A is in the form of a fork having four flexible tines and a handle. The tines or contacts 3, 4 are normally out of the plane of the tines or contacts 5, 6 in order to first engage the commutator segments of a generator, the coils of which are being tested, before the fork is depressed far enough to bring the contacts 5, 6 in engagement with other segments.

When outside contacts 3, 4 are first brought into engagement with the commutator segments, no current passes from the testing circuit through the meter or telephone receiver, and when the contacts 5, 6 are subsequently brought into engagement with adjacent commutator segments, the current passes through the coils of the meter or through the telephone receiver, giving a reading or a sound. As the instrument is jumped quickly from bar to bar around the commutator, if the coils are in perfect condition, the reading or the sound will be substantially the same for each contact.

This reading and sound varies in different electric machines. However, if the machine is in substantially perfect condition, the reading or sound will always be approximately the same in the same machine. If, however, there is a short circuit, a smaller reading or lower sound than normal will be obtained, as obviously the full current will not pass through the meter or telephone receiver. When the current indication has a reading or sound which varies from normal, the defective coil can be located by shifting the instrument A. Referring to Figure 2, when the outside contacts 3, 4 are first brought into engagement with the commutator sections 7ª, 7ᵇ, the current passes from the testing circuit 1, 2 through the outside contacts 3, 4, the commutator segments 7ª, 7ᵇ and the armature coils 8, 9, 10. When the contacts 5, 6 are brought into engagement with the segments 7ᶜ 7ᵈ the current passes through wire 2, contact 4, segment 7ᵇ, coil 10, segment 7ᵈ, contact 6, through the meter or telephone receiver, contact 5, segment 7ᶜ, coils 8, segment 7ª, contact 3, and wire 1. An induced current is also probably generated in the coil 9, which acts on the meter or telephone receiver. Just what the action of the current is is immaterial as the test is made by comparison only. Also it might be that the current from the contact 4 through coil 9 divides part passing through the segment 7ᵈ, contact 6, the meter or telephone receiver, contact 5, segment 7ᶜ, then coil 8, segment 7ᵈ, and contact 3, and part passing through the coil 9 so that the instrument connected to the contacts 5, 6 is in shunt with the coil 9.

However, as the resistance is greater through the coil 9 than through the instrument, it is believed that the greater part of the current passes through the instrument.

The coil 9 is the one under test and if the current indication or if the sound in the instrument is the same in all coils coming successively under test as the instrument is shifted, there is no trouble in the coils. However, if any coil under test is short circuited so that there is less resistance therethrough than in the normal coil, less current will pass through the instrument.

If the coil 9 is broken more current will pass through the instrument.

The contacts 3, 4 are adjustably mounted on bars 12, 13 in order to be separated to span a greater number of coils, as in some instances it is desirable to have a greater normal current indication as a greater reading or a greater noise. In some types of electric machines as motors or generators in which the coils are of fine wire, less current indication will be given when the contacts 3, 4 are separated owing to the fact that the resistance in these fine wire coils offsets the secondary current generated by the coil, it being understood that the coils of the machine in circuit with the outside contacts 3, 4 act as a primary coil. However, in motors etc. such as are used in electric railways in which the windings are of coarse wire, separation of the contacts 3, 4 cutting in a greater number of coils causes a greater number of coils in such primary circuit and hence a greater current indication is given in the instrument. However, the operation of the instrument is the same at whatever distances the contacts 3, 4 are separated.

The bars 12, 13, are carried by the handle or body of the instrument and are insulated therefrom and from each other, and the contacts 3, 4 are here shown formed with bearings 14, 15 slidable on the bars and held in position by set screws 16. The feed wires are connected to the bars 12, 13 and extend lengthwise of the handle and are connected to the binding devices 17, 18 electrically connected to the bars 12, 13. The tines or contacts 5, 6 are carried by the body or handle and are insulated from each other, and are connected in circuit with binding devices 19, 20 which make connections with the meter terminals or with binding posts 21, 22 to which the wires 23, 24 of the telephone receiver may be connected.

The current in the testing circuit is of low voltage for testing low resistance and the apparatus or instrument for supplying the testing current is adapted to be connected either in an alternating current circuit or a direct current circuit, and includes a plug 25 for connection to a supply circuit 26, an inductive transformer, the primary winding 28 of which is connected to the plug 25, and the secondary winding 29 of which is connected to binding posts 30, 31 or 32, 33 to which the lead wires 1, 2 are connected. A device for changing the direct to an alternating current, and a change-over switch for controlling the passage of current directly through the transformer and the binding posts, or for connecting said device in series with the primary winding 28 of the transformer between the source of direct current and the transformer.

When the source of supply is alternating current, the induction coil or transformer then operates on the ordinary transformer principle, thus supplying current for testing purposes.

The change-over switch as shown in the drawing makes the necessary connections to change the direct current supply into alternating current for testing purposes. The device for changing the direct current into an alternating current comprises an interrupter whose magnet coils are connected in series with the transformer or induction coil 28 and when the interrupter is attracted by its magnet it brings into contact terminals which short circuit the supply current and cut off the current from the induction coil 28 or transformer and the magnets of the interrupter. When the current through said magnet is interrupted the interrupter flies back and breaks the short circuited connection, thus allowing current from the source of supply to again flow through the transformer or induction coil 28 and through the magnets of the interrupter. In practice this action is repeated at a rapid rate. A quarter turn of the change-over switch makes connections to cut out the interrupter from the induction coil or transformer from the source of supply.

The switch 34 is provided with two members 35, 36 the member 35 being arranged to connect two conductors 37, 38 directly together when an alternating current is used, and is operated to disconnect the conductors 37, 38 when the switch is operated, and directly connect the conductors 37, 39. The member 36 is arranged to connect the conductors 38, 40 when the member 35 connects the conductors 37, 39.

In operation, assuming that the feed current is alternating, it passes from the plug 25 to wire 41 to binding post 42 to joint 43, wire 44, through the primary coil 28, wire 45 to the conductor 37 across the switch member 35, conductor 38, wire 46 to the binding post 47, wire 48, to the plug 25.

When the feed current is direct, the switch 34 is operated so that the switch member 35 connects the bars 37, 39, and the switch member 36 connects the bars 38 and 40. The current then passes from the plug 25, wire 48 binding post 47, wire 46, conductor 38, switch member 36, conductor 40, wire 49, joint 50, wire 51, through the magnet coils 52, wire 53, post 54, wire 55, conductor 39 to switch member 35, conductor 37, wire 45 through the primary coil 28, wire 44, to joint 43, binding post 42, wire 41 to the plug 25.

As soon as the magnet 52 is energized it attracts the interrupter or vibrator 56 causing the contact 57 thereon to engage the fixed contact 58 so that the current passes as before to the joint 50 and then passes through the wire 59 instead of through the coils 52, to the binding post 60, interrupter 56, contacts 57, 58 to wire 61 to the joint 43, thence to the plug. As soon as the magnets 52 are deenergized by the short circuiting of the current through the contacts 57, 58 the interrupter retracts and the circuit is again opened at the contacts 57, 58, and the current against passes through the magnet coils 52. In practice this operation repeats at a rapid rate.

The current induced in the secondary coil 29 passes to the post 30, to wire 62, to the binding post 32, to the lead wire 1 and the instrument, back through the lead wire 2 and the binding post 33, the wires 63, to the coil 29. When the lead wires are connected to the binding posts 30, 31 they are disconnected from the posts 32, 33.

The instrument shown in Fig. 1 is provided with an ammeter, while that shown in Fig. 1ª is connected to a telephone receiver 64 by wires connected in circuit with the inner contacts 5, 6.

In Fig. 8, an instrument C is shown for making a test on the stator coils or the coils of a machine not having a commutator, and as here shown the contacts 65 and 66 are points having handles, that is, they are awls, the points being insertable through the insulation of the coils and into contact therewith, one of these points having an ammeter 67 in series therewith. In making a test on stator coils, the coils are divided arbitrarily into sections, say the person making the test, tests the coils of each quarter of the stator, that is, he places the contact points 65 and 66 far enough apart to span one-fourth of the coils and notes the reading and proceeds to test the next quarter.

If the current indication is the same for all quarters, there is no trouble in the coils, if at any particular quarter the reading is different, he can gradually bring the points nearer together taking in each time a less number of coils noting the reading until by process of elimination the coil is located, in which there is a short circuit or other defect.

By this instrument defective armature or stator coils can be located in a very few minutes without tearing down the machine.

What I claim is:

1. An instrument for testing the coils of electric machines comprising a body, two pairs of tines carried by the body and insulated therefrom, a meter instrument carried by the body and connected in series with one pair of tines, the other pair of tines being connected respectively in the legs of a testing circuit, substantially as and for the purpose specified.

2. An instrument for testing the coils of electric machines comprising a fork having two pairs of tines, one pair being located between the members of the other pair, current indicating means in series with the intermediate tines, and the testing circuit having its branches connected respectively to the outside tines, and one pair of tines being resilient and normally arranged with their engaging ends in a different plane from the other pair of tines, substantially as and for the purpose set forth.

3. An instrument for testing the coils of electric machines comprising a fork having two pairs of substantially parallel tines, one pair being located between the other pair, the pair of tines being located in different parallel planes when the fork is held in horizontal position and also the tines being located in different vertical planes, one pair of tines being resilient whereby all tines can be brought into the same plane when pressure is applied to the fork, substantially as and for the purpose described.

4. An instrument for testing the coils of electric machines comprising a fork having two pair of tines, one pair being located between the other pair and out of vertical alinement therewith when the fork is held in horizontal position, some of the tines being normally arranged in a different horizontal plane than others, and being resilient whereby the tines are brought into substantially the same plane when pressure is applied to the fork, substantially as and for the purpose specified.

5. An instrument for testing the coils of electric machines comprising a fork having two pair of tines, one pair being located between the members of the other pair and out of vertical alinement therewith when the fork is held in horizontal position, current indicating means connected in series with one pair of tines and a testing circuit having its branches connected respectively to the members of the other pair of tines, and the tines being normally arranged in substantial horizontal planes when the fork is held in horizontal position and some of the tines being resilient whereby they are all brought into the same plane when pressure is applied to the fork, substantially as and for the purpose set forth.

6. An instrument for testing coils of electric machines comprising a fork including a body, laterally extending conductor bars insulated from each other, a pair of tines mounted on the bars and adjustable laterally thereon, and a second pair of tines interposed between the former pair and insulated therefrom and from each other, substantially as and for the purpose specified.

7. An instrument for testing coils of electric machines comprising a fork including a body, laterally extending conductor bars insulated from each other, a pair of tines mounted on the bars and adjustable laterally thereon, and a second pair of tines interposed between the former pair and insulated therefrom and from each other, one pair being resilient and normally having their engaging ends out of the plane of the ends of the other pair, substantially as and for the purpose set forth.

8. A testing instrument for electrical machines comprising a fork including a handle, two pairs of tines carried by the handle and insulated from each other and from the handle, one pair being located intermediate of the members of the other pair, and a meter mounted on the handle and connected in series with the members of the intermediate pair, the outer pair being connected to the legs of the feed circuit, substantially as and for the purpose described.

9. A testing instrument for electrical machines comprising a fork including a handle, bars extending laterally from the handle and insulated therefrom and from each other, two pairs of tines insulated from each other and from the handle, one pair being located intermediate of the members of the other pair, and a meter mounted on the handle and connected in series with the members of the intermediate pair, the outer pair being connected to the legs of the feed circuit, and being mounted on and adjustable laterally along the bars, substantially as and for the purpose specified.

In testimony whereof, I have hereunto signed my name at Syracuse, in the county of Onondaga, and State of New York, this 27th day of June, 1917.

JOHN B. WEST.